United States Patent
Shelton

(10) Patent No.: US 10,812,967 B2
(45) Date of Patent: Oct. 20, 2020

(54) WIRELESS FIELD DEVICES HAVING EMBEDDED DEVICE DESCRIPTION DATA

(71) Applicant: HONEYWELL INTERNATIONAL INC., Morris Plains, NJ (US)

(72) Inventor: Ronald Earl Shelton, North Wales, PA (US)

(73) Assignee: Honeywell International Inc., Morris Plains, NJ (US)

(*) Notice: Subject to any disclaimer, the term of this patent is extended or adjusted under 35 U.S.C. 154(b) by 33 days.

(21) Appl. No.: 15/939,968

(22) Filed: Mar. 29, 2018

(65) Prior Publication Data

US 2019/0306699 A1    Oct. 3, 2019

(51) Int. Cl.
*H04W 8/24* (2009.01)
*H04L 12/24* (2006.01)

(52) U.S. Cl.
CPC ........... *H04W 8/24* (2013.01); *H04L 41/0869* (2013.01)

(58) Field of Classification Search
CPC .............. G05B 19/042; G05B 19/4185; G05B 2219/31113; G05B 2219/31115; G05B 2219/31119; G05B 2219/31121; G05B 2219/31131; G05B 2219/31134; G05B 2219/36169; G05B 2219/32144; H04L 29/12; H04L 67/10; H04L 67/12; H04W 12/009; H04W 80/00
See application file for complete search history.

(56) References Cited

U.S. PATENT DOCUMENTS

| | | | |
|---|---|---|---|
| 9,661,079 B2 | 5/2017 | Pulini et al. | |
| 9,807,726 B1* | 10/2017 | Nguyen | H04W 40/244 |
| 2003/0229472 A1* | 12/2003 | Kantzes | G05B 19/4065 |
| | | | 702/183 |
| 2007/0282463 A1* | 12/2007 | Hodson | G05B 19/4186 |
| | | | 700/20 |
| 2012/0221126 A1* | 8/2012 | Banerjee | G05B 19/042 |
| | | | 700/81 |
| 2013/0289747 A1* | 10/2013 | Panther | G05B 19/4185 |
| | | | 700/52 |
| 2016/0182285 A1* | 6/2016 | Ferguson | H04L 67/34 |
| | | | 709/228 |
| 2018/0113573 A1* | 4/2018 | Kulus | G05B 19/409 |

* cited by examiner

Primary Examiner — Kan Yuen

(57) ABSTRACT

A method of automatically providing a device description (DD) file for a wireless field device wirelessly coupled at least in part to a wireless device manager (WDM) that is coupled to a process controller in a process control network of an industrial processing facility (IPF). The wireless field device is provided with a sensor or an actuator, a controller, a transceiver and antenna, and with the DD file embedded in its memory. Responsive to a triggering event, the WDM automatically sends a read request to the wireless field device for reading the DD file. Responsive to the read request, the wireless field device transmits DD data for the DD file to the WDM wirelessly across at least a portion of a path to the WDM. The WDM receives and uploads the DD file.

12 Claims, 4 Drawing Sheets ns the DD files generally
WIRELESS FIELD DEVICES HAVING EMBEDDED DEVICE DESCRIPTION DATA

FIELD

Disclosed embodiments relate to wireless field device communications with a device manager (WDM) in a process control network within an industrial processing facility, specifically to device description files for supporting such communications.

BACKGROUND

Wireless networks have become frequently used for at least part of the communication path in industrial process control systems. For example, sensors typically being intelligent field devices (known as H1 device) having a transmitter and an antenna can provide parametric measurements from processing equipment that are sent over a wireless network for at least part of the communication path to a process controller, and actuators can receive control signals from process controllers over the same network. The intelligent field device can comprise a temperature transmitter, pressure transmitter, or a variety of different types of actuators.

A linking device such as a wireless device manager (WDM) with a process side field device access point (FDAP) may be positioned between the field devices and the process controller(s), such as a programmable logic controller (PLC) or a distributed control system (DCS) controller. The linking device communicates wirelessly with the field devices and generally communicates to the process controller through a wired connection, such as an Ethernet connection using MODBUS (a serial communications protocol), Open Process Control previously standing for Object Linking and Embedding (OLE) for process control, more recently called "Open Platform Communications" (OPC), or a Highway Addressable Remote Transducer (HART) protocol.

The linking device performs various functions such as synchronizing communications between various field devices. A device description (DD) file is a driver file having DD data used by the WDM as well as process controller(s) and other external interfaces such as asset managers that are connected to the WDM, to communicate with the field devices. Each field device can come with different versions of DD files. The DD file provides various information about the field device that includes the different types of function blocks and their quantity, initial values and supported ranges for different parameters of the blocks menus, methods and visualization elements, block instantiation details, and capability levels of the field device. WDM software conventionally reads this information from DD files provided by manufacturer for communicating with the field devices. DD files are typically in a binary format.

Wireless field devices, such as ISA100.11a, also known as ISA100 (a wireless networking technology standard developed by the International Society of Automation (ISA), or wireless HART (WHART) compliant wireless field devices, need installation of their DD files into the WDM of the process control network to access the features and capabilities of the field devices, and to allow interpretation of their messages and status when received by the WDM. These DD files are subject to revision while installed in the industrial processing facility (IPF), also known as a plant, to correct defects, or to stay aligned with changes in the firmware revisions of the field device that can take place over time.

Industrial customers typically acquire DD files generally by searching for and downloading them from a field device manufacturer's Internet website. The DD files are then loaded into the WDM by browsing to the location of the files on the personal computer (PC) hosting the WDM user interface. If the host PC does not have Internet access, then the DD files need to be first copied to the PC.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize a wireless field device manufacturer cannot control the intended pairing of DD files and firmware revisions for the field device. Customers may find it troublesome to search for and find the correct DD file needed by the WDM for their specific wireless field device on the wireless field device manufacturer's website. Moreover, the customers may not even have Internet access at the PC they use to interface with the WDM. In that case they must transfer the DD file from a PC that has Internet access to the PC interfacing with the WDM, so that they can download the DD file into the WDM. Thus, the DD file copying process to the WDM is inconvenient at best, and can result in a problem where customers sometimes do not upgrade their DDs when adding newer wireless field devices to their networks, or after they upgrade their field device firmware. This can expose defects or limit the field device's functionality.

Disclosed aspects include a method of automatically providing a DD file of a wireless field devices embedded in a memory of the wireless field device that is at least in part wirelessly coupled to a WDM that eliminates the customer's need for obtaining the wireless field device's DD files entirely. Customers can thus avoid any concern for or interaction with DD files. By embedding the DD file within firmware in the wireless field device's memory, the firmware can perform automatic downloading of the DD file to the WDM when needed (e.g., upon a read request from the WDM), allowing the control of the association of DD file and firmware revisions of the wireless field device, thus removing all customer dependency on the DD file obtaining process.

One disclosed embodiment comprises a method of automatically providing a DD file for a wireless field device coupled at least in part wirelessly to a WDM that is coupled to a process controller in a process control network of an IPF. The method includes providing the wireless field device with a sensor or an actuator, a controller, a transceiver and antenna, and with the DD file embedded in its memory. Responsive to a triggering event, the WDM automatically sends a read request to the wireless field device for reading the DD file. Responsive to the read request, the wireless field device transmits DD data for the DD file wirelessly across at least a portion of a path to the WDM. The WDM receives and uploads the DD file.

Disclosed methods provide a differentiation from known wireless field devices, such as conventional ISA100 or WHART devices. When a disclosed wireless field device first joins the wireless network or after its firmware is upgraded, the wireless field device will be functioning in the IPF's process control system as intended without the need for any additional IPF personnel interaction.

DETAILED DESCRIPTION

Figure 1:
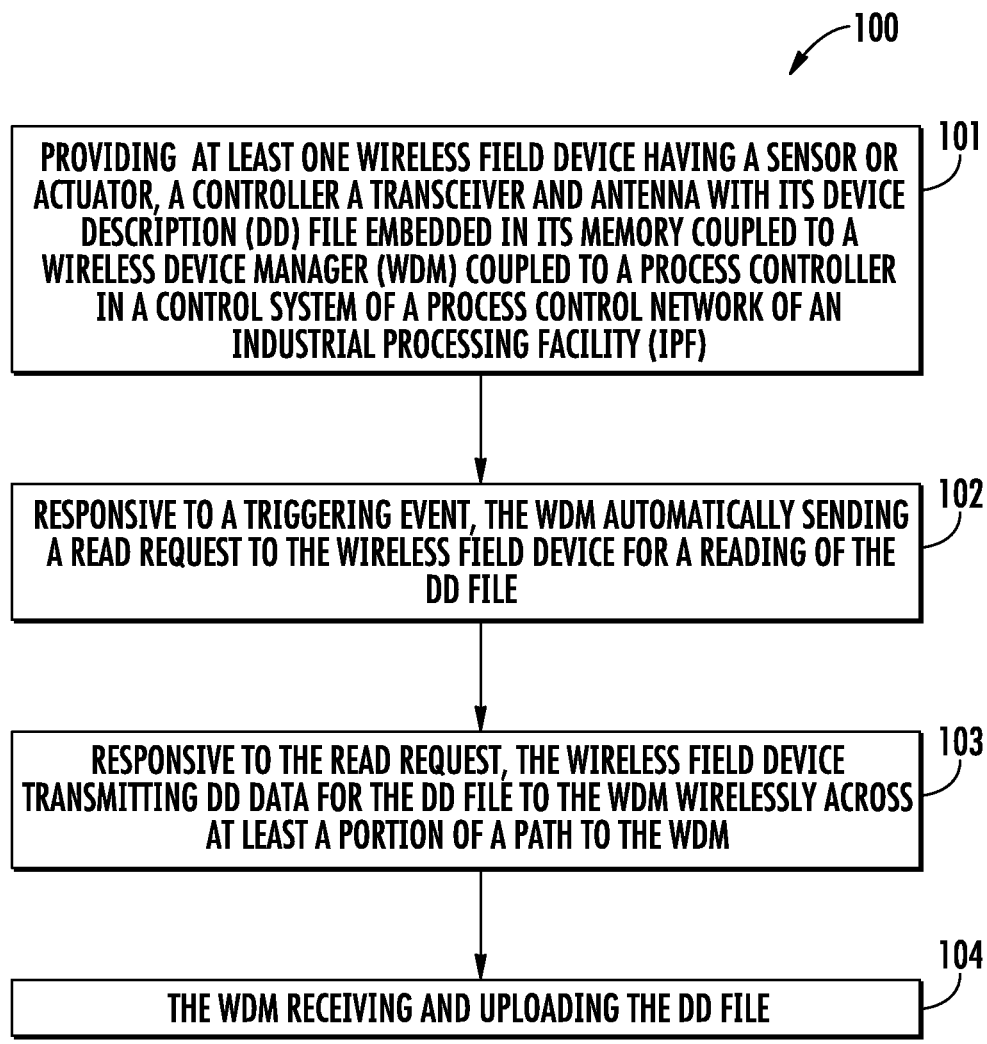
FIG. 1 is a flow chart that shows steps in a method of a method of automatically providing DD files from a field device to a WDM connected to a process controller in a control system of an IPF, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

FIG. 1 is a flow chart that shows steps in a method of a method 100 of automatically providing device a DD file from a wireless field device to a WDM connected to a process controller in a control system of a process control network of an IPF, according to an example embodiment. The process control network of the IPF may also be called an industrial control and automation system. As used herein an IPF runs an industrial process involving a tangible material that disclosed embodiments apply. For example, oil and gas, chemical, beverage, pharmaceutical, pulp and paper manufacturing, petroleum processes, electrical, and water. An IPF is distinct from a data processing system that only performs data manipulations.

Step 101 comprises providing the wireless field device with a sensor or an actuator, a controller, a transceiver and antenna, and with the DD file embedded in its memory. The wireless field device's firmware thus includes embedded DD data generally stored in a non-volatile memory that can be embedded at the wireless field device factory as firmware, so it becomes an integral part of the firmware file. The non-volatile memory can comprise various types of read-only memory (ROM), static random access memory (RAM), flash memory, most magnetic storage devices such as hard disks, magnetic tape, or an optical disk. This enhanced firmware file can be loaded into the wireless field device by the same method already used to deliver its firmware, at the factory, or by the customer as an upgrade.

Step 102 comprises responsive to a triggering event, the WDM automatically sending a read request to the wireless field device for a reading of the DD file. The WDM software is enhanced to automatically attempt a read of the embedded DD's version number from the wireless field device upon a triggering event, such as when the wireless field device joins the network. If the field device's DD file is not already loaded in the WDM and/or the WDM does not have the newer DD version, the WDM can then automatically upload the DD data from the field device, such as via a standard ISA100 object known as an Upload/Download Object (UDO).

Step 103 comprises responsive to the read request the wireless field device transmitting DD data for the DD file to the WDM wirelessly across at least a portion of a path to the WDM. The wireless field device includes a mechanism to deliver the stored DD file data using the available wireless network for at least a portion of the communication path to the WDM generally to another linking device having wireless capability such as the FDAPs 211a and 211b shown in FIG. 2 described below that communicates with a process controller over a wired Ethernet network. For ISA100 compliant field devices, The DD file can be delivered utilizing the UDO, which may already be defined in the firmware of the field device, to support firmware upgrades for the field device. There are other wireless methods for delivering the DD data along at least a portion of the communication path from the field device to the WDM. For example for WHART devices, device-specific commands can be used, which may be outside the scope of the protocol, and for ISA100 devices, protocol tunneling can be used, which can transport data with a different, possibly proprietary protocol.

As known in the art, algorithms for delivering the DD file data to the WDM may also be implemented by hardware as an alternative to by software. Regarding hardware-based implementations, algorithm equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the logic gate pattern.

Step 104 comprises the WDM receiving and uploading the DD file. The WDM then provides the DD file to the process controller, and generally to other external interfaces, such the Honeywell International EXPERION PKS and FIELD DEVICE MANAGER, that help plant personnel to manage the health of their automation and production assets with real-time visibility into the actual health status of their equipment, users from operations, maintenance, reliability and other departments to provide a understanding to properly execute production and maintenance plans.

Figure 2:
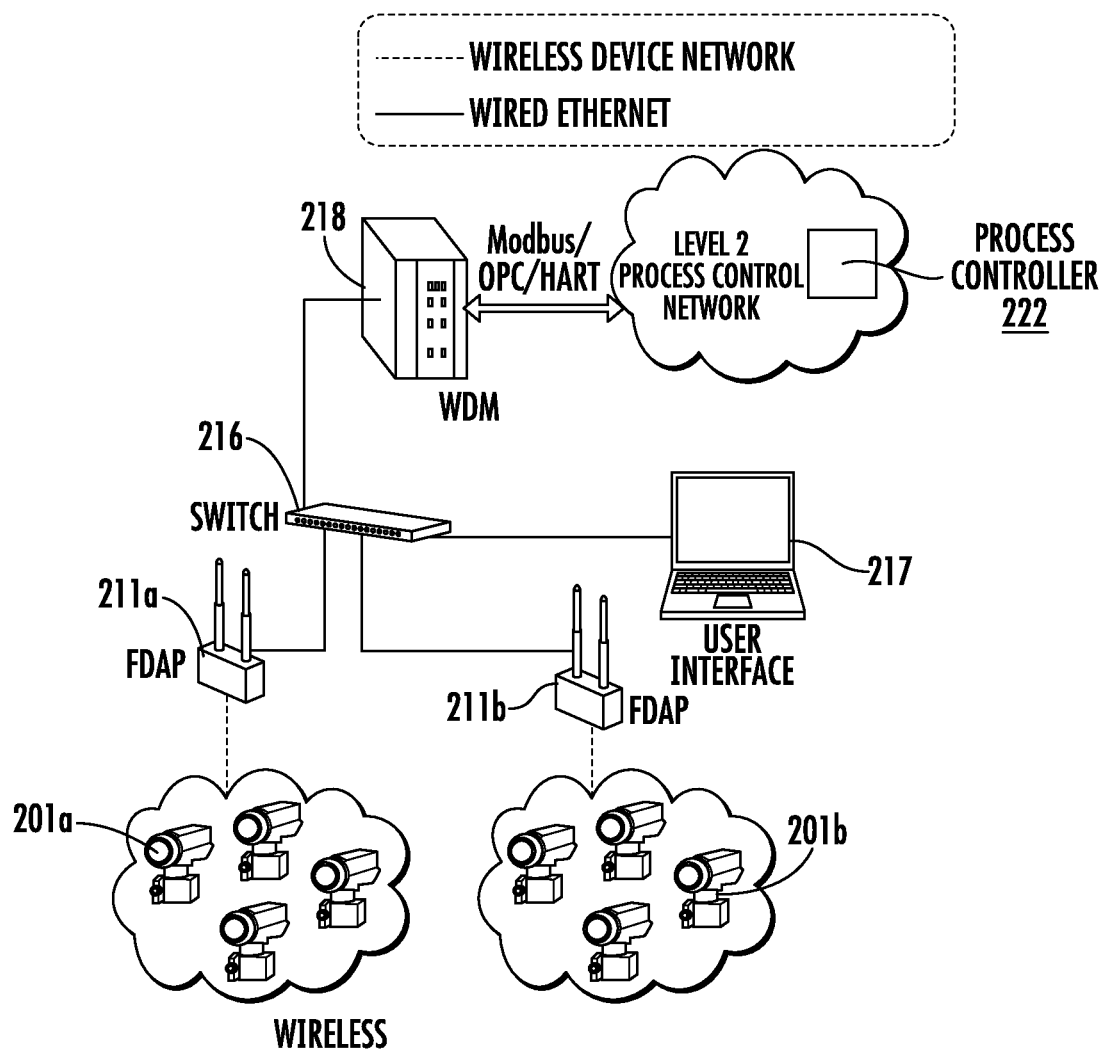
FIG. 2 is depiction of a depiction of portion of a control system showing wireless field devices coupled indirectly to a WDM that is wirelessly coupled through field device access points (FDAPs), and then though an optional switch to the WDM, according to an example embodiment.

FIG. 2 is depiction of a depiction of portion of a control system showing a first group of wireless field devices 201a and a second group of wireless field devices 201b coupled indirectly to a WDM 218 that is wirelessly coupled through a first FDAP 211a, and a second FDAP 211b, and then through an optional switch 216 to the WDM 218, according to an example embodiment. The WDM 218, is shown coupled to a process controller 222, such as a programmable logic controller (PLC) or a distributed control system (DCS) controller. The switch 216 is shown controlled by a user interface 217 that can be used to manage Ethernet traffic where necessary, which although shown Ethernet connected, can also be supported by the same wireless protocol used in the process control network.

Figure 3:
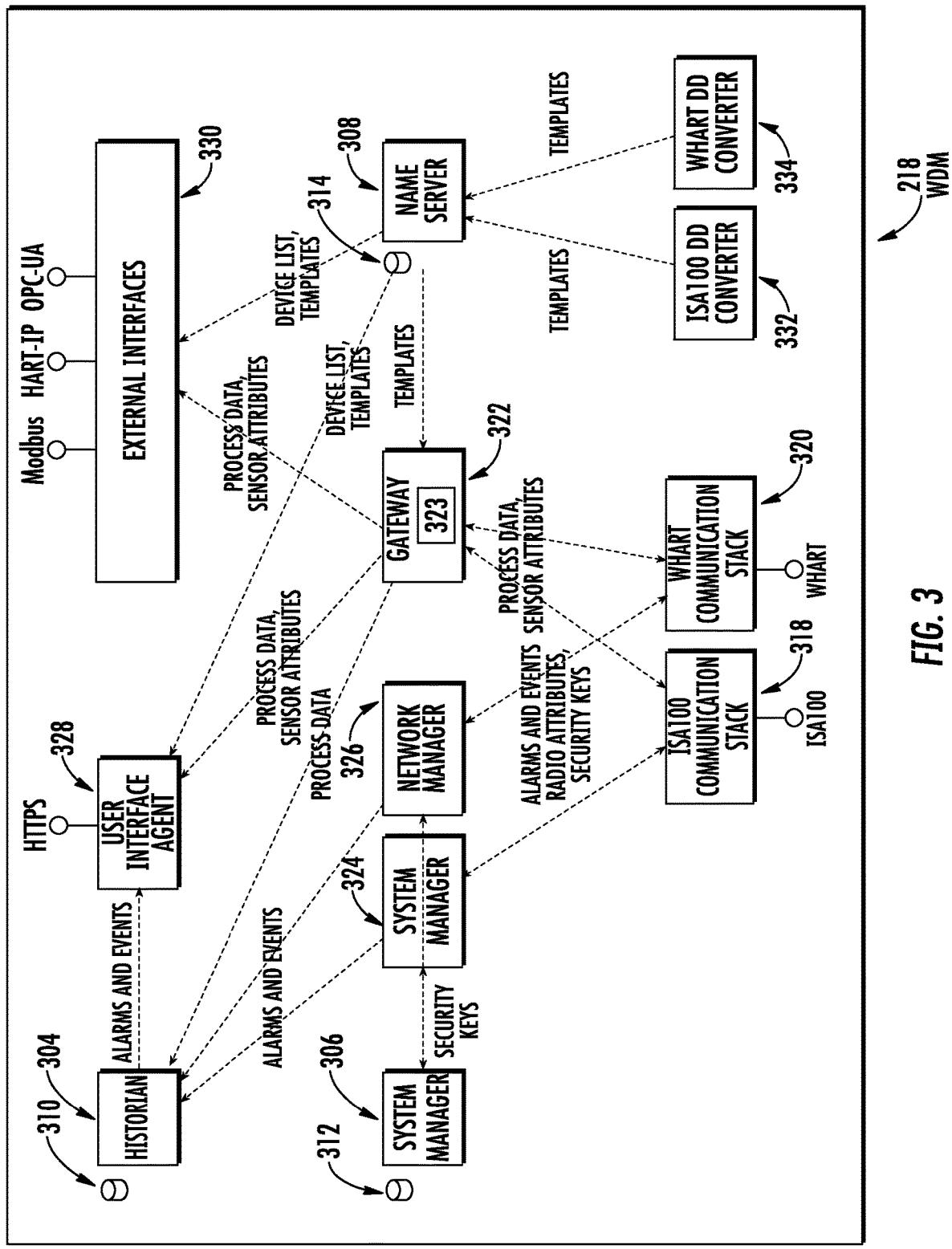
FIG. 3 illustrates an example WDM of an industrial control and automation system.

FIG. 3 illustrates an example WDM 218 of an industrial control and automation system that can be used with this Disclosure. The WDM 218 includes various components, each of which can be implemented using hardware and/or software or firmware instructions (which can be executed by a hardware platform). Note that while these components are shown as forming a centralized WDM 218, the components in FIG. 3 can be divided and executed on multiple platforms in a distributed manner.

A historian 304 can be used to log various process data, alarms, and events received at the WDM 218. This data can then be used for various purposes, such as reporting. A security manager 306 can be used to provide security keys or other wireless network credentials. In some embodiments, the security manager 306 can act as a centralized security repository for all wireless devices, regardless of which protocols are used by the wireless devices. This can help to avoid the need to maintain separate sets of security keys for devices that use different protocols. A name server 308 can be used to identify field instruments that are in use and available for interaction with the WDM 218. The name server 308 can provide device lists identifying those field instruments and templates identifying how to process data from those field instruments. The historian 304, security manager 306, and name server 308, can include various storage devices 310-314, respectively. These storage devices 310-314 can be used to store information used by those components.

The WDM 218 also includes multiple protocol stacks 318-320, each associated with a different communication protocol. In this example, the protocol stacks include an ISA100 Wireless protocol stack 318 and a WHART protocol stack 320. The protocol stacks 318-320 are used to exchange process data and sensor attributes with a gateway 322, which can provide that data to the historian 304 and other components.

The protocol stacks 318-320 also exchange alarms, events, radio attributes, and security keys with at least two managers 324-326, which are associated with different communication protocols. The manager 324 can represent a system manager used to manage an ISA100 network, and the manager 326 can represent a network manager used to manage a WHART network. The manager 324 can communicate via the protocol stack 318, while the manager 326 can communicate via the protocol stack 320. The managers 324-326 can perform various functions to support the management of ISA100 Wireless and WHART networks, such as allowing nodes to join the networks and security validation. The managers 324-326 can also manage the radio attributes of devices connected to the networks.

A user interface agent 328 interacts with external devices supporting user interfaces. In this example, the user interface agent 328 can be accessed using Hypertext Transfer Protocol Secure (HTTPS), although other access mechanisms can be used. The user interface agent 328 receives alarms, events, process data, sensor attributes, and device lists from various sources and provides this data to the user interface. The user interface agent 328 can provide this data using templates to ensure a unified display is presented to a user regardless of the protocol used.

Various external interfaces 330 can also provide process data, sensor attributes, device lists, templates, and other data to external clients and systems, such as a distributed control system (DCS). Any suitable protocol(s) can be supported by the external interfaces 330. In this example, the protocols include MODBUS, HART-IP, and OPC-UA protocols.

Two optional converters 332-334 shown are used to convert the loaded wireless field device DD files into suitable templates which have a common internal format for use in storing DD data in a unified format. This template conversion into a common internal format feature is optional for the subject matter described in this Disclosure. The templates are used to map device data fields and formats to a user interface agent 328, and to recognize the formatting of the data received from the device at the gateway 322. The name server 308 stores the templates on its storage device 314, which contain a device identifier and DD version, so the WDM 218 can use this information to decide whether it needs the DD initially to be loaded if the wireless field device is unknown, or updated if the field device is known but the DD file version at the WDM 218 is older than the version of the DD file embedded in the wireless field device.

The converters 332-334 generally accept DD files for different field devices. As disclosed herein, the DD files provided by device manufacturers that describe the various capabilities of the field devices are embedded in the field device and are transmitted to the WDM 218. The converters 332-334 can use this information to map various data fields associated with the devices to data fields of a unified display. The converters 332-334 can also use this information to determine the formats of the various data fields associated with the devices and to determine how to convert those formats into a unified format. Although shown here as separate converters, a single converter could be used to convert different protocols into templates.

In one aspect of operation, the name server 308 can provide templates to the gateway 322, which allow the gateway 322 to identify the native formats of data sent by wireless devices and how to interpret or normalize that data into a unified format. The gateway 322 can then receive and cache (store) data from the wireless devices, such as process data and sensor attributes. For instance, the gateway 322 can cache this data as that data is published by the wireless devices. The gateway 322 can also make that data available in the unified format regardless of protocol.

The unified format resolves differences between data formats of the different communication protocols. When stored in the unified format, the data may also be normalized so that process data from wireless devices having different specifications have similar types, bit widths, and ranges. For example, an ISA100 wireless field device may give an 8-bit status and a 32-bit floating point temperature reading, while a similar WHART field device might give a 12-bit status and a 24-bit unsigned integer temperature for a similar temperature. Using the templates, the gateway 322 can understand both native formats and translate or normalize the data into a unified format to have a common representation of data from both types of wireless field devices. Via the gateway 322, a user can use a web browser to view information from one, some, or all of the field devices in a network.

Data from one or more wireless devices may be transferred to external clients or systems via a request-response technique. Using this technique, an external client (via the user interface agent 328 or external interface 330) sends a request for data to the WDM 120. The request is received by the gateway 322, and the gateway 322 determines if the requested data is already stored in a cache 323. If so, the gateway 322 sends the data to the external client. If not, the gateway 322 can send a request to the appropriate wireless device(s) and obtain the data from the wireless device(s). The gateway 322 converts the response data into the unified format, normalizes the response data, and puts the response data into its cache 323. The gateway 322 then returns the response data to the client using the unified format.

If multiple external clients request the same data from a wireless field device, the gateway 322 can receive the multiple requests and send a single request to the wireless field device. The gateway 322 can then send response data in the unified format to the multiple requesting external clients. In this way, the gateway 322 can reduce power consumption of the wireless devices by throttling messages between external clients and the wireless devices.

Process data from a wireless field device is often published via a publishing technique. That is, the wireless device publishes process data at a specified interval, and other components called subscribers can receive publications from the wireless device. Published process data from a wireless field device can come directly to the gateway 322, and the gateway 322 can update the published process data as more publications from the wireless device are received. The gateway 322 also monitors the receipt of publications to ensure that publications are continuously received. If the gateway 322 determines that publications have stopped or become stale, the gateway 322 can mark the data related to the publications in the cache 323 as invalid and no longer sends such data to external clients, and data marked as invalid can be removed from the cache 323. This prevents external clients from receiving stale data and allows the external clients to take appropriate actions based on the data being marked invalid or not being sent.

A publication period indicates how often publications are sent from wireless field devices. A stale limit can indicate how many publication periods can be missed before the data is treated as stale and marked as invalid in the cache 323 of the gateway 322. The publication period and stale limit may be configured via external clients and can be maintained for individual wireless devices or groups of wireless devices.

Templates can also be used by the user interface agent 328 and the external interfaces 330. For example, the templates can be used by the user interface agent 328 to define how alarms are presented in a unified format. The templates can be used by the user interface agent 328 and the external interfaces 330 to ensure that process data and sensor attributes are displayed correctly in the unified format.

By providing the templates to the various components of the WDM 218, the various data collected from the wireless field devices can be provided to users and external clients in a unified format. Also, configurations and other settings for the wireless field devices can be collected from users and external clients in a unified format. This can be accomplished regardless of the protocol or protocols used to communicate with the wireless field devices.

Although FIG. 3 illustrates one example of a WDM 218 of an industrial control and automation system, various changes may be made to FIG. 3. For example, various components in FIG. 3 could be omitted, combined, or further subdivided and additional components could be used according to particular needs.

Figure 4:
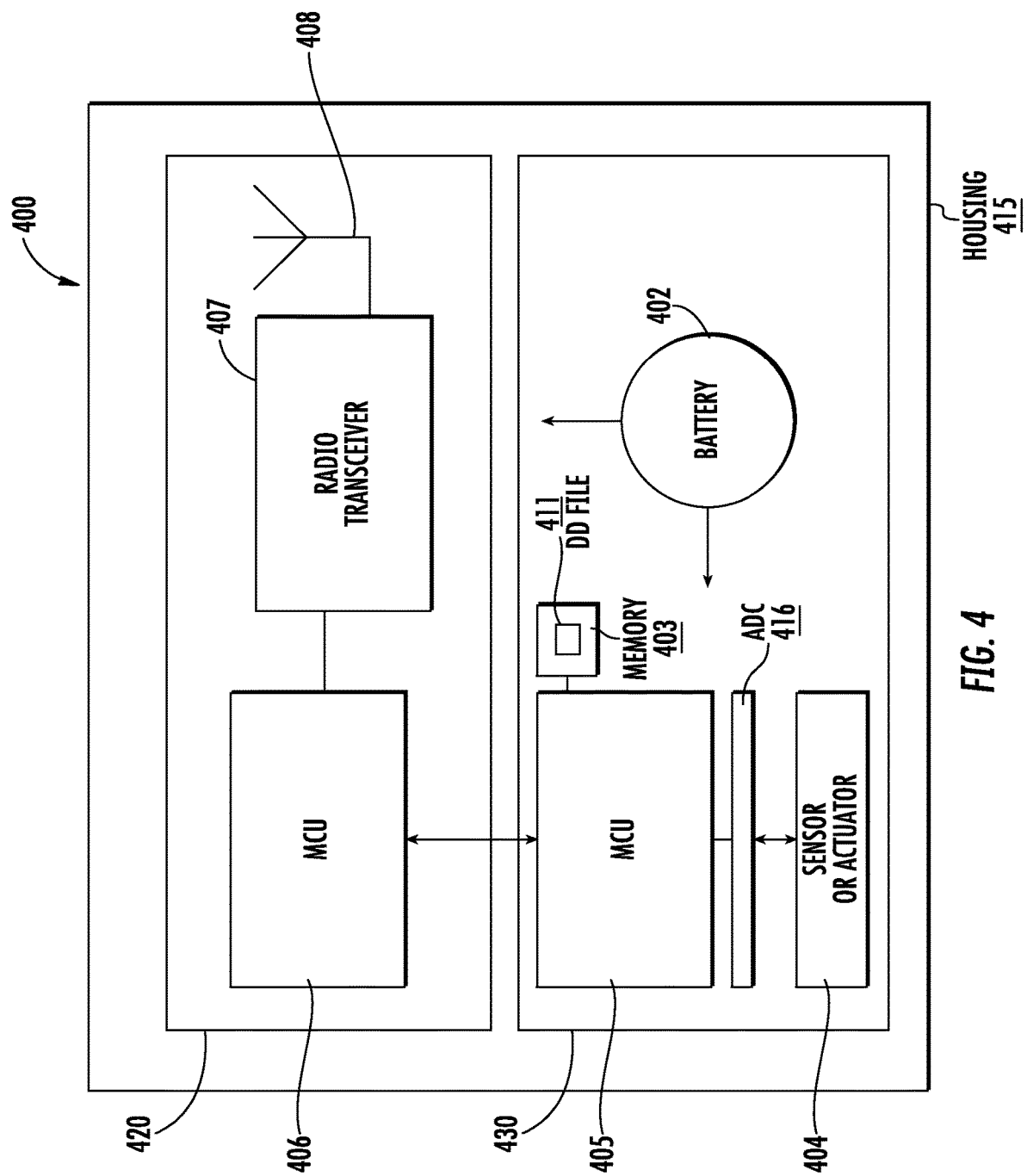
FIG. 4 shows a simplified block diagram of disclosed wireless field device having a radio microcontroller unit (MCU) section and a sensor MCU section including a disclosed DD file embedded in its NV memory.

FIG. 4 shows a simplified block diagram of disclosed wireless field device 400 having a radio MCU section 420 including a radio MCU 406 comprising a radio transceiver 407 coupled to an antenna 408, and a sensor MCU section 430 including a MCU 405 having a disclosed DD file 411 embedded in its NV memory 403. The sensor MCU section also includes a sensor or an actuator 404, and an analog-to-digital converter (ADC) 416. The sensor MCU 405 and radio MCU 406 communicate with each other directly, so that requests for DD file data received by the radio MCU 406 from a WDM (not shown in FIG. 4) are digitized, and are then sent to the sensor MCU 405. The radio MCU has firmware 413, which can be conventional firmware. The field device 400 also includes an outer housing 415.

Disclosed embodiments can be applied to generally any plant control system having a process controller(s), WDM (s), and field devices. Other applications for disclosed embodiments include safety systems which as known in the art are configured in parallel to the process control system to interlock the process control system so that immediate actions are taken should the process control system fail. Another application is for process monitoring, where process adjustments are infrequent and are generally made manually.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of automatically providing a device description (DD) file for a wireless field device coupled to a wireless device manager (WDM) that is coupled to a process controller in a process control network of an industrial processing facility (IPF), comprising:

providing said wireless field device with a sensor or an actuator, a controller, a transceiver and antenna, an analog-to-digital converter (ADC) and with said DD file embedded in a memory of said wireless field device, the wireless field device comprising of a radio section, and a sensor section; said DD file including DD data comprising a device identifier, a DD version for said DD file, initial values and supported ranges for at least one parameter, and capabilities;

said WDM automatically detecting a triggering event;

responsive to the triggering event, said WDM automatically sending a read request to said wireless field device for reading of said DD file;

responsive to the read request, said wireless field device automatically transmitting said DD file, and said WDM receiving and uploading said DD file;

wherein said read request for said DD data is received by said radio section, is digitized by said ADC, and is then sent to said sensor section;

wherein said memory further comprises stored firmware for performing said automatic downloading said DD data for said DD file responsive to said read request received from said WDM.

2. The method of claim 1, wherein said triggering event comprises a time when said wireless field device joins the process control network, wherein said WDM uses said wireless field device's identification (ID) that it reads when said wireless field device first joins said process control network then matches stored DD files to various devices by said various device' ID to determine whether said WDM has said DD file for an ID of said wireless field device.

3. The method of claim 1, wherein said triggering event comprises said WDM determining it does not have a newest version of said DD file.

4. The method of claim 3, wherein said determining said WDM reading a version number of said DD file which is part of said DD data, and then comparing said version number with a version number of a DD file said WDM already has, so that said WDM will only load said DD file when it has a newer said version number.

5. The method of claim 1, wherein said process control network includes at least one field device access point (FDAP).

6. The method of claim 1, wherein said memory comprises a non-volatile memory.

7. The method of claim 1, further comprising: said WDM providing said DD file to said process controller, and running an industrial process including using signals from said wireless field device through said WDM to said process controller for at least one of controlling and monitoring said industrial process including involving said wireless field device.

8. The method of claim 1, wherein said WDM providing said DD file to said process controller is over a wired Ethernet network.

9. A wireless field device having stored device description (DD) data, comprising:
- a radio section including a controller, radio transceiver and an antenna, an analog-to-digital converter (ADC) and a sensor section including said controller or another controller, a sensor or an actuator, wherein said sensor section and said radio section are communicably coupled;
- a memory, wherein a DD file comprising said DD data including a device identifier and a DD version, initial values and supported ranges for at least one parameter, and capabilities is embedded in said memory along with code for automatic downloading of said DD file to a wireless device manager (WDM) coupled to a process controller in a process control network of an industrial processing facility (IPF) upon for receiving an automatically sent read request for said DD file from said WDM automatically sent responsive to automatically detecting a triggering event;
- said automatic downloading comprising said wireless field device transmitting said DD data for said DD file to said WDM wirelessly across at least a portion of a path to said WDM;
- wherein said read request for said DD data is received by said radio section, is digitized by said ADC, and is then sent to said sensor section;
- wherein said memory further comprises stored firmware for performing said automatic downloading said DD data for said DD file responsive to said read request received from said WDM.

10. The wireless field device of claim 9, wherein said memory comprises a non-volatile memory.

11. The wireless field device of claim 9, wherein said controller of said sensor section is separate from said controller of said radio section, and wherein each said controller comprises a microcontroller unit (MCU).

12. The wireless field device of claim 9, wherein said DD data includes a DD version number.

* * * * *